US00RE45600E

(19) United States
(12) Reissued Patent
Tsai, Jr. et al.

(10) Patent Number: US RE45,600 E
(45) Date of Reissued Patent: Jul. 7, 2015

(54) TECHNIQUES FOR COLLABORATIVE POWER MANAGEMENT FOR HETEROGENEOUS NETWORKS

(71) Applicants: Shian Tsai, Jr., Portland, OR (US); Tsung-Yuan Tai, Portland, OR (US)

(72) Inventors: Shian Tsai, Jr., Portland, OR (US); Tsung-Yuan Tai, Portland, OR (US)

(73) Assignee: INTEL CORPORATION, Santa Clara, CA (US)

(21) Appl. No.: 13/889,472

(22) Filed: May 8, 2013

Related U.S. Patent Documents

Reissue of:
(64) Patent No.: 8,145,920
Issued: Mar. 27, 2012
Appl. No.: 12/208,905
Filed: Sep. 11, 2008

U.S. Applications:
(60) Provisional application No. 60/973,044, filed on Sep. 17, 2007, provisional application No. 60/973,031, filed on Sep. 17, 2007, provisional application No. 60/973,035, filed on Sep. 17, 2007, provisional application No. 60/973,038, filed on Sep. 17, 2007.

(51) Int. Cl.
*G06F 1/00* (2006.01)
*G06F 1/32* (2006.01)
*G06F 1/26* (2006.01)

(52) U.S. Cl.
CPC .... *G06F 1/32* (2013.01); *G06F 1/26* (2013.01)

(58) Field of Classification Search
CPC ..... G06F 1/26; G06F 1/32
USPC ..... 713/300, 324, 340
See application file for complete search history.

(56) References Cited

U.S. PATENT DOCUMENTS

| | | | |
|---|---|---|---|
| 5,560,022 | A | 9/1996 | Dunstan et al. |
| 5,802,305 | A | 9/1998 | McKaughan et al. |
| 6,292,831 | B1 | 9/2001 | Cheng |
| 6,377,512 | B1 | 4/2002 | Hamamoto et al. |

(Continued)

FOREIGN PATENT DOCUMENTS

| | | | |
|---|---|---|---|
| CN | 1497454 | A | 5/2004 |
| CN | 1747463 | A | 3/2006 |

(Continued)

OTHER PUBLICATIONS

Law, David, "IEEE 802.3 Clause 30 Management, MIB, Registers and Function", IEEE P802.3az, Energy-efficient Ethernet Task Force, Plenary Week Meeting, Nov. 2007, pp. 1-13.

(Continued)

*Primary Examiner* — Jaweed A Abbaszadeh
*Assistant Examiner* — Phil Nguyen
(74) *Attorney, Agent, or Firm* — Kacvinsky Daisak Bluni PLLC

(57) ABSTRACT

Techniques for collaborative power management for heterogeneous networks are described. An apparatus may include a first node having a managed power system and a power management module to manage power states for the managed power system. The power management module may be operative to communicate power state information with a second node over a communications connection, and manage the power states for the managed power system based on power state information for the second node. Other embodiments are described and claimed.

23 Claims, 4 Drawing Sheets

(56) References Cited

U.S. PATENT DOCUMENTS

| | | | | |
|---|---|---|---|---|
| 6,408,006 | B1 | 6/2002 | Wolff | |
| 6,463,542 | B1 | 10/2002 | Yu et al. | |
| 6,601,178 | B1 | 7/2003 | Gulick | |
| 6,934,914 | B1 * | 8/2005 | Vittal et al. | 715/763 |
| 7,039,430 | B2 | 5/2006 | Kang et al. | |
| 7,212,786 | B2 | 5/2007 | Kojima et al. | |
| 7,313,712 | B2 | 12/2007 | Cherukuri et al. | |
| 7,320,080 | B2 | 1/2008 | Solomon et al. | |
| 7,346,715 | B2 | 3/2008 | Hatano | |
| 7,356,561 | B2 | 4/2008 | Balachandran et al. | |
| 7,426,597 | B1 | 9/2008 | Tsu et al. | |
| 7,564,812 | B1 | 7/2009 | Elliott | |
| 7,573,940 | B2 | 8/2009 | Connor et al. | |
| 7,577,857 | B1 | 8/2009 | Henderson et al. | |
| 7,813,296 | B2 | 10/2010 | Lindoff et al. | |
| 7,869,360 | B2 * | 1/2011 | Shi | 370/231 |
| 7,925,908 | B2 | 4/2011 | Kim | |
| 8,145,920 | B2 | 3/2012 | Tsai et al. | |
| 8,312,307 | B2 | 11/2012 | Hays | |
| 2002/0004840 | A1 | 1/2002 | Harumoto et al. | |
| 2002/0196736 | A1 | 12/2002 | Jin | |
| 2003/0126494 | A1 | 7/2003 | Strasser | |
| 2003/0196137 | A1 | 10/2003 | Ahmad et al. | |
| 2004/0025063 | A1 * | 2/2004 | Riley | 713/300 |
| 2004/0029622 | A1 * | 2/2004 | Laroia et al. | 455/574 |
| 2004/0073723 | A1 | 4/2004 | Hatano | |
| 2004/0106431 | A1 * | 6/2004 | Laroia et al. | 455/552.1 |
| 2004/0128387 | A1 | 7/2004 | Chin et al. | |
| 2005/0003836 | A1 * | 1/2005 | Inoue et al. | 455/458 |
| 2005/0063302 | A1 | 3/2005 | Samuels et al. | |
| 2005/0097378 | A1 | 5/2005 | Hwang | |
| 2005/0128990 | A1 | 6/2005 | Eom et al. | |
| 2005/0147082 | A1 | 7/2005 | Keddy et al. | |
| 2005/0190709 | A1 | 9/2005 | Ferchland et al. | |
| 2005/0195859 | A1 * | 9/2005 | Mahany | 370/478 |
| 2005/0204072 | A1 | 9/2005 | Nakagawa | |
| 2005/0208958 | A1 | 9/2005 | Bahl et al. | |
| 2005/0243795 | A1 * | 11/2005 | Kim et al. | 370/347 |
| 2005/0268137 | A1 | 12/2005 | Pettey | |
| 2006/0164774 | A1 | 7/2006 | Herbold et al. | |
| 2006/0239282 | A1 | 10/2006 | Dick et al. | |
| 2006/0253735 | A1 | 11/2006 | Kwak et al. | |
| 2007/0245076 | A1 | 10/2007 | Chang et al. | |
| 2008/0159183 | A1 | 7/2008 | Lindoff et al. | |
| 2009/0164821 | A1 | 6/2009 | Drescher | |
| 2009/0196212 | A1 | 8/2009 | Wentink | |
| 2010/0165846 | A1 | 7/2010 | Yamaguchi et al. | |

FOREIGN PATENT DOCUMENTS

| | | | |
|---|---|---|---|
| CN | 1809013 | A | 7/2006 |
| CN | 1976297 | A | 6/2007 |
| EP | 1783951 | A2 | 5/2007 |
| JP | 2002-026795 | A | 1/2002 |
| JP | 2004-118746 | A | 4/2004 |
| JP | 2005-250671 | A | 9/2005 |
| JP | 2005-328439 | A | 11/2005 |
| JP | 2006-148749 | A | 6/2006 |
| JP | 2006-277332 | A | 10/2006 |
| JP | 2008-059577 | A | 3/2008 |
| JP | 2008-167224 | A | 7/2008 |
| WO | 03/060716 | A1 | 7/2003 |
| WO | 2007/049203 | A2 | 5/2007 |
| WO | 2008/035600 | A1 | 3/2008 |
| WO | 2009/061880 | A2 | 5/2009 |
| WO | 2009/061880 | A3 | 7/2009 |
| WO | 2010/030768 | A2 | 3/2010 |
| WO | 2010/030768 | A3 | 7/2010 |

OTHER PUBLICATIONS

Law, David, "IEEE P802.3az Energy-Efficient Ethernet Architecture", IEEE P802.3az EEE Task Force, Version 2.0, Plenary week Meeting, Nov. 2008, pp. 1-20.

Law, David, "IEEE P802.3az Energy-efficient Ethernet and LLDP", IEEE P802.3az EEE Task Force, Version 1.1, Interim Meeting, May 2008, pp. 1-7.

Law, David, "IEEE P802.3az Asymmetric and Symmetric Modes", IEEE P802.3az EEE Task Force, Interim Meeting, Jan. 2009, Version 1.0, pp. 1-6.

Law, David, "Two TX Wait Timers in RS for 10GBASE-T Operation", IEEE P802.3az EEE Task Force, Version 1.0, Interim Meeting, Jan. 2009, pp. 1-4.

Kubo et al., "Hybrid LPI and Subset PHY Approach", IEEE 802.3az, NTT Access Network Service Systems Labs., NTT Corporation, Jul. 2008, pp. 1-10.

Louie et al., "Clause 73 Message p. 10", Broadcom, IEEE 802.3az Task Force, Jan. 2009, pp. 1-6.

McIntosh, James A., "Getting Stuck in Update in the 1000BASE-T PHY Control State Machine", Vitesse Semiconductor Corp., IEEE 802.3az, Interim Meeting, Jan. 2009, pp. 1-8.

Nedevschi et al., "Reducing Network Energy Consumption via Sleeping and Rate-Adaptation", Jan. 2008, 14 pages.

Nicholl, Gary, "100GE and 40GE PCS Overview", IEEE 802.3az, Nov. 2008, pp. 1-27.

Nordman, Bruce, "Musings on Savings", IEEE 802.3az Task Force Interim Meeting, Jan. 22, 2008, 8 pages.

Parnaby, Gavin, "EEE Synchronization", Solarfare Communication, Jan. 14, 2009, pp. 1-5.

Parnaby, Gavin, "10GBASE-T ad hoc output", Solarflare Communication, Sep. 16, 2008, pp. 1-10.

Parnaby, Gavin, "10GBASE-T EEE Synchronization", Solarflare Communication, Nov. 11, 2008, pp. 1-16.

Parnaby, Gavin, "Filling the 10GBASE-T TBDs: Wake & Sleep", Solarflare Communication, Sep. 15, 2008, pp. 1-6.

Parnaby, Gavin, "10GBASE-T Parameter Values", Sep. 2008, 1 page.

Pillai et al., "Clause 49 State DiagramsClause Diagrams", Broadcom, IEEE 802.3az, Jan. 2009, 7 pages.

Pillai, Velu, "Enhanced EEE proposal for 10GBASE-KR", Broadcom, IEEE 802.3az, Mar. 2009, 8 pages.

Pillai et al., "KR, KX4 and KX LPI Parameters", Broadcom, IEEE 802.3az, Jan. 2009, pp. 1-16.

Pillai, "Values Needed for 10GBASE-KR", Mar. 11, 2009, pp. 1-3.

Powell et al., "A "Subset Phy" Approach for Energy Efficient Ethernet", Broadcom, IEEE 802.3az EEE, Jan. 2008, pp. 1-17.

Powell, Scott, "Twisted Pair Subset PHY", Broadcom, IEEE 802.3az EEE, Mar. 2008, pp. 1-21.

Powell et al., "A Gigabit "Subset PHY"Approach for 10GBASE for 10GBASE—T Energy Efficient Ethernet", Broadcom, IEEE 802.3az EEE, Nov. 2007, pp. 1-11.

Ratnasamy et al., "Reducing Network Energy Consumption Via Sleeping and Rate-Adaptation", Nov. 2007, pp. 1-29.

Sedarat, Hossein, "10GBASE-T EEE Specifications Alert", Aquantia, Sep. 2008, pp. 1-7.

Sedarat, Hossein, "10GBase-T EEE Specifications", Refresh, Quiet, Aquantia, Sep. 2008, pp. 1-14.

Sedarat, Hossein, "Refresh an Option to Ease 10gbase-TLPI Parameter Selection", Aquantia, Sep. 2008, pp. 1-9.

Taich et al., "Enhancements to the Low-Power Idle Mode", 802.3az Plenary Meeting, Mar. 12, 2008, pp. 1-14.

Taich et al., "10GBASE-T Low-Power Idle Proposal", 802.3az Plenary Meeting, May 11, 2008, pp. 1-22.

Taich et al., "Alert Signal Proposal for 10GBASE-T EEE", Energy Efficient Ethernet (802.3az), Seoul, Korea, Sep. 2007, pp. 1-7.

Taich, Dimitry,"Additional Test Modes Definition for 10GBASE-T LPI", Energy Efficient Ethernet (802.3az), Dallas, TX, Nov. 4, 2008, pp. 1-9.

Taich et al., "Alert Signal Proposal for 10GBASE-T EEE", Energy Efficient Ethernet (802.3az), Seoul, Korea, Sep. 13, 2008, pp. 1-8.

Taich, Dimitry, "Annex of the 10GBASE-T EEE Alert Signal Proposal", Energy Efficient Ethernet (802.3az), Seoul, Korea, Sep. 13, 2008, pp. 1-4.

Telang et al., "A "Subset PHY" Approach for 10GBASE-KR Energy Efficient Ethernet", IEEE 802.3az, Orlando, Florida, Mar. 2008, 16 pages.

(56) References Cited

OTHER PUBLICATIONS

"Tellado et al., ""Alert signal Comments for 10GBASE-T EEE"", Energy Efficient Ethernet (802.3az), Dallas, US, Nov. 2008, pp. 1-9."
Thompson, Geoff, "Another View of Low Power Idle / Idle Toggle", Version 0.2, Orlando, Mar. 2008, pp. 1-14.
Thompson, Geoff, "Another Piece of EEE", An additional requirement for Energy Efficient Ethernet, Atlanta, Nov. 2007, 7 pages.
Tidstrom, Rick, "IEEE P802.3az D1.0 Clause 55 State Diagrams updated", Broadcom, IEEE 802.3az Task Force, Nov. 2008, pp. 1-17.
Traber, Mario, "Low-Power Idle for 1000bT", IEEE P802.3az EEE Task-Force, Plenary Meeting, Mar. 2008, pp. 1-21.
Traber, Mario, "The European COC", IEEE P802.3az EEE Task-Force, Plenary Meeting, Mar. 2008, pp. 1-11.
Walewski, Joachim W., "EEE for Real-Time Industrial Ethernet (?)", IEEE 802 plenary meeting, Vancouver, BC, Mar. 10, 2009, pp. 1-15.
Wertheimer, Aviad, "Negotiation Proposal for LPI EEE", IEEE 802.3az Task Force, Mar. 2008, pp. 1-10.
Woodruff et al., "10GBASE-T EEE Proposal xLPI", Aquantia, May 2008, pp. 1-11.
Zimmerman et al., "10GBase-T Active / Low-Power Idle Toggling", Energy Efficient Ethernet, Mar. 2008, pp. 1-15.
Zimmerman et al., "10GBase-T Active / Low Low-Power Idle Toggling with Sense Interval", Energy Efficient Ethernet, Mar. 2008, pp. 1-2.
Zimmerman et al., "Deep Sleep Idle Concept for PHYs", Energy Efficient Ethernet, Solarflare Communication, Nov. 6, 2007, pp. 1-14.
Barrass, Hugh, "EEE control protocol proposal", IEEE 802.3az EEE Task Force, Atlanta, Georgia, Nov. 2007, pp. 1-11.
Barrass, Hugh, "EEE Exchange of Management Information", IEEE 802.3az EEE Task Force, Vancouver, British Columbia, Mar. 2009, pp. 1-11.
Baumer et al., "A "Subset PHY" Approach for 10GBASE-KR Energy Efficient Ethernet", IEEE 802.3az, Portland, Oregon, Jan. 2008, pp. 1-7.
Bennett, Mike, "Energy Efficient Ethernet and 802.1", IEEE 802.3az Energy Efficient Ethernet Task Force, Feb. 15, 2008, pp. 1-9.
Bennett, Mike, "IEEE 802.3az Energy Efficient Ethernet", Open Questions for the Task Force, IEEE Plenary Meeting, Atlanta, GA, Nov. 2007, 13 pages.
Bennett, Mike, "IEEE 802.3az Energy Efficient Ethernet", Task Force Update, Presented to the P802.3ba Task Force, IEEE Plenary Meeting, Denver, CO, Jul. 16, 2008, pp. 1-19.
Booth, Brad, "Supporting Legacy Devices", AMCC, IEEE 802.3az Interim Meeting, Jan. 2008, 10 pages.
Booth, Brad, "Backplane Ethernet Low-Power Idle", AMCC, May 2008, 14 pages.
Chadha, Mandeep, "Transmit Amplitude Reduction "Green-T": The path to a "greener" 10BASE-T", IEEE 802.3az Interim Meeting, Jan. 2008, pp. 1-11.
Chadha, Mandeep, "Cat5 Twisted Pair Model for "Green" 10BASE-T", IEEE 802.3az Interim Meeting, Jan. 2008, pp. 1-22.
Chadha, Mandeep, "Re-optimization of Cat5 Twisted Pair Model for 10BASE-Te", IEEE 802.3az Interim Meeting, Sep. 2008, pp. 1-28.
"Chou et al., "Proposal of Low-Power Idle 100Base-TX", IEEE 802.3az Task Force Interim Meeting, Jan. 2008, pp. 1-26."
Chou, Joseph, "Response to comments on Clause 24 of Draft 1p1", IEEE 802.3az Task Force Interim Meeting, Jan. 2009, pp. 1-8.
Chou et al., Low-Power Idle based EEE 100Base-TV, IEEE 802.3az Task Force Interim Meeting, Mar. 2008, pp. 1-18.
Chou et al., "EEE Compatible 100Base-TX", IEEE 802.3az Task Force Interim Meeting, May 2008, pp. 1-25.
"Chou, Joseph, ""Corner cases and Comments on EEE Clause 40"", IEEE 802.3az Task Force Interim Meeting, Sep. 2008, pp. 1-18."
"Chou, Joseph, ""Making EEE GPHY more robust on corner cases"", IEEE 802.3az Task Force Plenary Meeting, Nov. 2008, pp. 1-14."
"Chou et al., ""Feasibility of Asymmetrical Low-Power Idle 1000Base-T"", IEEE 802.3az Task Force InterimMeeting, Jan. 2008, pp. 1-14."
Chou et al., "A pathway to Asymmetric EEE GPHY", IEEE 802.3az Task Force Plenary Meeting, Mar. 2008, pp. 1-23.
"Chou et al., ""EEE Compatible MI/GMII Interface"", IEEE 802.3az Task Force Interim Meeting, May 2008, pp. 1-16."
Chou, Joseph, "Timing Parameters of LPI 100BASE-TX", IEEE 802.3az Task Force Plenary Meeting, Jul. 2008, pp. 1-14.
Frazier et al., "Technical Open Items for LPI", IEEE 802.3az, Orlando, FL, Mar. 2008, pp. 1-9.
"Diab, Wael W., ""802.3az Task Force Layer 2 Ad-Hoc Report"", IEEE 802.3az Layer 2 Ad-Hoc Report on PlenaryMeeting, Mar. 10, 2009, pp. 1-13."
Diab, Wael W., "Discussion with 802.1 Regarding 802.3at/802.3az use of LLDP", IEEE 802.3 Joint Discussion with 802.1, Denver, Jul. 2008, pp. 1-15.
Carlson et al., "802.3az Jan. 2009 Interim: LLDP's Use in EEE", IEEE P802.3az EEE, Jan. 2009, pp. 1-31.
Dietz, Bryan, "802.3az D1.1 Clause 22.2.1 Transmit Deferral during LPI",802.3az Interim Meeting, Jan. 6, 2009, pp. 1-6.
Diminico, Chris, "Physical Layer Considerations for Link Speed Transitions", EEE Study Group, pp. 1-8.
Dove, Dan, "Energy Efficient Ethernet Switching Perspective", IEEE 802.3az Interim Meeting, Jan. 2008, pp. 1-14.
Dove, Dan, "Energy Efficient Ethernet Switching Perspective", IEEE 802.3az Interim Meeting, May 2008, pp. 1-19.
Dove, Dan, "Energy Efficient Ethernet xxMII Clarifications", IEEE 802.3az Interim Meeting, May 2008, pp. 1-7.
Diab, Wael W., "Energy Efficient Ethernet and 802.1", IEEE 802 Plenary, Atlanta, GA, Nov. 16, 2007, 23 pages.
Wang et al., "IEEE P802.3az/D1.1 Clause 24 Receive State Diagram Corner Case Analysis", IEEE P802.3az Task Force, New Orleans, Jan. 2009, pp. 1-6.
Grimwood et al., "LPI Synchronization Feasibility Questions", IEEE P802.3az Task Force, Orlando, FL, Mar. 2008, pp. 1-12.
Grimwood, Mike, "Energy Efficient Ethernet 1000 BASE-T LPI Wait-Quiet Timer", IEEE P802.3az Task Force, Seoul, Sep. 2008, pp. 1-6.
Lin et al., "IEEE P802.3az/D1.1 Clause 40 PHY Control State Diagram Corner Case Analysis", IEEE 02.3az Task Force, New Orleans, Jan. 2009, pp. 1-9.
Grimwood et al., "Energy Efficient Ethernet 1000BASE-T LPI Timing Parameters Update", IEEE P802.3az Task Force, Denver, CO, Jul. 2008, pp. 1-9.
Grimwood et al., "IEEE P802.3az/D1.0 Clause 40 Ipi_mode Encoding", IEEE P802.3az Task Force, Dallas, Nov. 2008, pp. 1-12.
Grimwood et al., "IEEE P802.3az/D1.0 Clause 55 PHY Wake Time Updated", IEEE P802.3az Task Force, Dallas, Nov. 2008, pp. 1-6.
Hays, Robert, "Terminology Proposal for LPI EEE", IEEE 802.3az Task Force, Orlando, FL, Mar. 2008, pp. 1-8.
Wertheimer et al., "Capabilities Negotiation Proposal for Energy-Efficient Ethernet", IEEE 802.3az, Munich, May 2008, pp. 1-18.
Hays et al., "Active/Idle Toggling with OBASE-x for Energy Efficient Ethernet", IEEE 802.3az Task Force, Nov. 2007, pp. 1-22.
Hays, Robert, "EEE Capabilities Negotiation Proposal Revision 2", IEEE 802.3az Task Force, May 2008, pp. 1-13.
Minutes of meeting, 802.3az Energy Efficient Ethernet (EEE) Task Force and 802.1 Data Center Bridging (DCB) Task Group Joint meeting, Wednesday, Mar. 19, 2008, 5 pages.
Parnaby et al., "10GBase-T Active / Low-Power Idle Toggling", Energy Efficient Ethernet, Jan. 2008, pp. 1-14.
Teener, Michael D., "Joint ITU-T/IEEE Workshop on Carrier-class Ethernet", AudioNideo Bridging for Home Networks, IEEE 802.1 AV Bridging Task Group, Geneva, May 31-Jun. 1, 2007, 35 pages.
Healey et al., "1000BASE-T Low-Power Idle", IEEE P802.3az Task Force Meeting, Jan. 2008, pp. 1-14.
Healey et al., "1000BASE-T Low-Power Idle update", IEEE P802.3az Task Force Meeting, Orlando, FL, Mar. 18, 2008, pp. 1-13.
Healey et al., "1000BASE-T Low-Power Idle", IEEE P802.3az Task Force Meeting, Munich, Germany, May 13, 2008, pp. 1-22.
Fitzgerald et al., "1000BASE-T PHY Control State Diagram Modifications", IEEE P802.3az Task Force Meeting, New Orleans, LA, Jan. 2009, pp. 1-25.

(56) References Cited

OTHER PUBLICATIONS

Healey, Adam, "Proposed Modifications to IEEE 802.3az/D0.9 Clause 40", IEEE P802.3az Task Force Meeting, Seoul, KR, Sep. 2008, pp. 1-13.
Healey, Adam, "Observations regarding Energy Efficient 1000BASE-KX", IEEE P802.3az Task Force Meeting, Dallas, TX, Nov. 2008, pp. 1-13.
Healey, Adam, "PHY timers for 1000BASE-T Energy Efficient Ethernet", IEEE P802.3az Task Force Meeting, Vancouver, BC, Mar. 11, 2009, pp. 1-13.
Healey et al., "Supporting material related to comments against Clause 40", IEEE P802.3az Task Force Meeting, Dallas, TX, Nov. 11, 2008, pp. 1-29.
International Search Report and Written Opinion received for PCT Patent Application No. PCT/US2008/082577, mailed on May 25, 2009, 10 pages.
Frazier, Howard, "Review of the 5 Criteria", IEEE 802_3 EEESG, Jan. 2007, 29 pages.
Frazier et al., "EEE transition time constraints", IEEE 802.3 EEE SG, Geneva, CH, May 29, 2007, pp. 1-9.
Ganga et al., "End-Stations System Requirements and a proposal for EEE Objectives", IEEE 802.3 EEE SG presentation for Mar. 2007 Plenary, Mar. 9, 2007, pp. 1-12.
Grow, Bob, "802.1 and Energy Efficient Ethernet", IEEE 802.3 EEESG Interim, Seoul, Korea, Sep. 11, 2007, pp. 1-6.
Haran, Onn, "Applicability of EEE to fiber PHYs", IEEE 802.3 EEE meeting, Seoul, Korea, Sep. 2007, pp. 1-12.
Koenen, David, "EEE for Backplane PHYs in Blade Server Environment", IEEE 802.3 EEE SG, Mar. 2007, pp. 1-8.
Koenen, David, "Potential Ethernet Controller Power Savings", EEE, Geneva, May 2007, pp. 1-5.
10GBASE-T Power Budget Summary, Tehuti Networks, Mar. 2007, pp. 1-3.
Law et al., "Scope components for Rapid PHY selection", 2 pages.
Law, David, "Transmit disable time in a packet based speed change protocol Impact on objectives", IEEE 802.3 EEE SG Interim Meeting, May 2007, pp. 1-8.
Law, David, Packet loss in protocol based speed change, IEEE 802.3 EEE SG Interim Meeting, Sep. 2007, pp. 1-12.
Holt et al., "Observations and Thoughts On Rate Switching", Mar. 13, 2007, pp. 1-8.
IEEE Energy Efficient Ethernet Study Group, Unapproved Minutes, Orlando, FL, Mar. 13-15, 2006, 10 pages.
Nordman, Bruce, "Energy Efficient Ethernet: Outstanding Questions", IEEE 802 interim meeting, Monterey, California, Jan. 15-16, 2007, pp. 1-10.
Nordman, Bruce, "Energy Efficient Ethernet: Outstanding Questions-Update: Mar. 2007", IEEE 802 interim meeting, Orlando, Florida, Mar. 13-15, 2007, pp. 1-5.
Nordman, Bruce, "EEE Savings Estimates", IEEE 802 Plenary Meeting, San Francisco, Jul. 18, 2007, 9 pages.
Nordman, Bruce, "EEE Savings Estimates", May 25, 2007, pp. 1-11.
Nordman, Bruce, "Energy Efficient Ethernet: Outstanding Questions", Mar. 12, 2007, 3 pages.
Nordman, Bruce, "Energy Efficient Ethernet: Outstanding Questions", Mar. 19, 2007, 3 pages
Paxson, Vern, "Some Perspectives on the Performance Impact of Link-Speed Switching Outages", Jul. 18, 2007, 10 pages.
Powell et al., "Technical Considerations and Possible Solution Sets for EEE", IEEE 802.3 Energy Efficient Ethernet Study Group Interim Meeting, Broadcom, May 2007, pp. 1-7.
Thompson, Geoff, "0 Base-T Possibilities", Presented to Energy Efficient Ethernet Study Group, Jul. 2007, 10 pages.
Woodruff, "10GEEE—Time to Switch", Mar. 2007, pp. 1-8.
Woodruff et al., Efficiency and EEE-Technical Feasibility, May 29, 2007, pp. 1-15.
Zimmerman, George, "Considerations for Technical Feasibility of EEE with 10GBASE-T", Solarfare Communications, Mar. 7, 2007, pp. 1-10.
Zimmerman et al., "Update on Technical Feasibility of EEE with 10GBASE-T", Solarfare Communication, Jul. 16, 2007, pp. 1-9.
Bennett et al., Minutes of Meeting held on Jan. 13, 2009, 7 pages.
Bennett et al., Minutes of Meeting held on Mar. 10, 2009, 5 pages.
Bennett et al., "Energy Efficient Ethernet Study Group Meeting Minutes", Jan. 22, 2008, 6 pages.
Bennett et al., "IEEE802.3az task force meeting", IEEE 802 Plenary, Orlando, FL, Mar. 18, 2008, 15 pages.
Bennett et al., Minutes of Meeting held on May 13, 2008, 8 pages.
Bennett et al., Minutes of Meeting held on Jul. 15, 2008, 6 pages.
Bennett et al., Minutes of Meeting held on Sep. 16, 2008, 5 pages.
Bennett et al., Minutes of Meeting held on Nov. 11, 2008, 5 pages.
Bennett, Mike, "IEEE 802.3az Energy Efficient Ethernet", Agenda and general information, Munich, Germany, May 2008, pp. 1-28.
Bennett, Mike, "IEEE 802.3 Energy Efficient Ethernet Study Group", Agenda and general information, San Francisco, California, Jul. 2007, pp. 1-31.
Barnette et al., "Speed Switching without Communication Interruption", Vitesse, Prepared for the IEEE 802.3 Study Group, Nov. 2007, pp. 1-15.
Barrass, Hugh, EEE Backplane Architecture, IEEE 802.3az EEE Task Force, Vancouver, British Columbia, Mar. 2009, pp. 1-10.
Kasturia, Sanjay, "Next Steps for EEE Draft", Jan. 13, 2009, pp. 1-15.
Kasturia, Sanjay, "Next Steps for EEE Draft", Mar. 10, 2009, pp. 1-13.
Kasturia, Sanjay, Generating the EEE Draft, May 2008, 10 pages.
Kasturia, Sanjay, "Next steps for EEE Draft", Jul. 16, 2008, pp. 1-18.
Kasturia, Sanjay, "Next steps for EEE Draft", Nov. 11, 2008, pp. 1-14.
Klein, Phillippe, "802.1 AVB Power Management", Broadcom, IEEE Interim Meeting, Jan. 2009, pp. 1-15.
Koenen, David, "In support of EEE mode for 1000BASE-KX PHY", HP, IEEE 802.3az EEE Task Force, May 2008, pp. 1-8.
Koenen, David, "Conditions for Backplane PHY EEE Transitions", HP, IEEE 802.3az, Nov. 2007, pp. 1-10.
Koenen et al., "Towards consistent organization of LPI Functions, State Variables and State Diagrams", IEEE Energy Efficient Ethernet TF, Nov. 2008, pp. 1-9.
Koenen, David, "Backplane Ethernet Low-Power Idle Baseline Proposal", IEEE 802.3az EEE Task Force, Jul. 2008, pp. 1-14.
Law, David, "IEEE P802.3az Wait Time (Tw) From a System Design Perspective", IEEE P802.3az, IEEE Task Force, Version 3.0, Interim Meeting, Jan. 2009, pp. 1-18.
Law, David, "IEEE P802.3az Wake Time Shrinkage Ad Hoc report", IEEE P802.3az EEE Task Force, Version 5.0, Plenary week Meeting, Mar. 2009, pp. 1-13.
Hays, Robert, U.S. Appl. No. 11/936,327, titled "Energy Efficient Ethernet Using Active/Idle Toggling", filed Nov. 7, 2007, 31 pages.
Conner et al., U.S. Appl. No. 11/296,958, titled "Data Transmission at Efficient Data Rates", filed Dec. 7, 2005, 33 pages.
Conner et al., U.S. Appl. No. 12/484,028, titled "Energy Efficient Data Transmission", filed Jun. 12, 2009, 37 pages.
Office Action Received for U.S. Appl. No. 121484,028, mailed on Nov. 5, 2012, 15 pages.
Office Action Received for U.S. Appl. No. 12/484,028, mailed on Sep. 19, 2013, 20 pages.
Office Action Received for U.S. Appl. No. 12/484,028, mailed on Apr. 5, 2013, 20 pages.
Wertheimer et al., U.S. Appl. No. 12/381,811, titled "Negotiating a Transmit Wake Time", filed Mar. 17, 2009, 31 pages.
Notice of Allowance Received for U.S. Appl. No. 12/381,811, mailed on Aug. 31, 2011, 9 pages.
Supplemental Notice of Allowance Received for U.S. Appl. No. 12/381,811, mailed on Feb. 9, 2012, 9 pages.
Office Action Received for U.S. Appl. No. 13/489,434, mailed on Dec. 26, 2012, 9 pages.
Notice of Allowance Received for U.S. Appl. No. 13/489,434, mailed on Jun. 4, 2013, 8 pages.
Tsai et al., U.S. Appl. No. 12/208,905, titled "Techniques for Collaborative Power Management for Heterogeneous Networks", filed Sep. 11, 2008, 48 pages.

(56) References Cited

OTHER PUBLICATIONS

Wang et al., U.S. Appl. No. 13/540,246, titled "Generating, at Least in Part, and/or Receiving, at Least in Part, at Least One Request", filed Jul. 2, 2012, 24 pages.
Tsai et al., U.S. Appl. No. 60/973,044, titled "Techniques for Collaborative Power Management for Heterogeneous Networks", filed Sep. 17, 2007, 48 pages.
Agarwal et al., "Dynamic Power Management using On Demand Paging for Networked Embedded System", Proceedings of the 2005 Asia and South Pacific Design Automation Conference, vol. 2, Jan. 18-21, 2005, 5 pages.
Shih et al., "Physical Layer Driven Protocol and Algorithm Design for Energy-Efficient Wireless Sensor Networks", Proceedings of the 7th annual international conference on Mobile computing and networking; Rome, Italy, Jul. 15-21, 2001, 14 pages.
Office Action Received for Chinese Patent Application No. 200880115221.6, mailed on Apr. 6, 2012, 6 Pages of Chinese Office Action and 9 Pages of English Translation.
Office Action Received for U.S. Appl. No. 12/210,016, mailed on Jun. 9, 2011, 16 pages.
Notice of Allowance Received for U.S. Appl. No. 12/210,016, mailed on Mar. 5, 2012, 13 pages.
Wang et al., U.S. Appl. No. 12/210,016, titled "Generating, at Least in Part, and/or Receiving, at Least in Part, at Least One Request", filed Sep. 12, 2008, 25 pages.
Office Action Received for Japanese Patent Application No. 2011-526969, mailed on Jun. 5, 2012, 2 pages of office action and 2 pages of english translation.
Office Action Received for Japanese Patent Application No. 2011-526969, mailed on Oct. 2, 2012, 2 pages of office action and 2 pages of english translation.
Office Action Received for Chinese Patent Application No. 200980135378.X, mailed on Mar. 6, 2013, 11 pages of office action and 14 pages of english translation.
Office Action Received for Korean Patent Application No. 10-2011-7005968, mailed on Jun. 19, 2012, 3 pages of office action and 2 pages of english translation.
Magic PacketTechnology, AMD, Publication No. 20213, Rev: A, Amendment/O, Nov. 1995, pp. 1-6.
"Broad Market Potential", IEEE interim meeting, Geneva, CH, May 2007, pp. 1-5.
Energy Efficient Ethernet Call—For-Interest Summary and Motion, IEEE 802.3 Working Group, Dallas, TX, Nov. 16, 2006, pp. 1-8.
Bennett, Mike, "IEEE 802.3 Energy Efficient Ethernet Study Group", Agenda and General Information, Monterey, CA, Jan. 2007, pp. 1-25.
Bennett, Mike, "IEEE 802.3 Energy Efficient Ethernet Study Group", Agenda and General Information, Orlando, FL, Mar. 2007, pp. 1-26.
Bennett, Mike, "IEEE 802.3 Energy Efficient Ethernet Study Group", Agenda and General information, Ottawa, ON, Apr. 2007, pp. 1-27.
Bennett, Mike, "IEEE 802.3 Energy Efficient Ethernet Study Group", Agenda and General Information, Geneva, Switzerland, May, 2007, pp. 1-31.
IEEE Energy Efficient Ethernet Study Group, Unapproved Minutes, Ottawa, ON, Canada, Apr. 17-18, 2007, 5 pages.
Barrass, Hugh, "Energy Efficient Ethernet Objectives & 5 Criteria", A strawman to spur discussion and drive towards consensus, IEEE 802.3 Energy Efficient Ethernet, Monterey, CA, Jan. 2007, pp. 1-12.
Barrass, Hugh, "Energy Efficient Ethernet Setting the bar", A system developer's view of new PHY proposals, IEEE 802.3 Energy Efficient Ethernet, Orlando, Florida, Mar. 2007, pp. 1-7.
Barrass, Hugh, "Energy Efficient Ethernet Beyond the PHY", Power savings in networked systems, IEEE 802.3 Energy Efficient Ethernet, Geneva, Switzerland, May 2007, pp. 1-12.
Barrass, Hugh, "Energy Efficient Ethernet Transparent—not invisible", Some important considerations for management of EEE, IEEE 802.3 Energy Efficient Ethernet, San Francisco, Jul. 2007, pp. 1-8.
Bennett, Mike, "IEEE 802.3 Energy Efficient Ethernet Study Group", Server Bandwidth Utilization plots, Orlando, FL, Mar. 2007, pp. 1-13.
Booth, Brad, "802.3 Standards Development Lessons Learned", AMCC, Jan. 2007, pp. 1-19.
Chadha et al., "Feasibility of 1000-Base-T RPS Restart", Vitesse, IEEE 802.3 EEE SG, Interim Meeting, Apr. 2007, pp. 1-9.
Chadha et al., "10BT Amplitude Optimization", Vitesse, IEEE 802.3 EEE SG, Interim Meeting, Apr. 2007, pp. 1-5.
Chalupsky et al., "A Brief Tutorial on Power Management in Computer Systems", Intel Corporation, Mar. 13, 2007, pp. 1-28.
Christensen, Ken, "Rapid PHY Selection (RPS): A Performance Evaluation of Control Policies", IEEE 802.3 EEE Study Group, Monterey, CA, Jan. 15, 2007, pp. 1-45.
Christensen, Ken, "Rapid PHY Selection (RPS): Emulation and Experiments using PAUSE", IEEE 802.3 EEE Study Group, Orlando, FL, Mar. 13, 2007, pp. 1-16.
Carlson et al., "Energy Efficient Ethernet Another Look at the Objectives", IEEE 802.3 EEE SG, Geneva, Switzerland, May 2007, pp. 1-6.
Diab et al., "Subset PHY: Cost and Power Analysis", IEEE 802.3 EEESG, Broadcom, Seoul, South Korea, Sep. 2007, 10 pages.
"Project Authorization Request (PAR) Process", May 31, 2007, IEEE standard information technology, 3 pages.
Energy Efficient Ethernet Call-For For-Interest, IEEE 802.3 Working Group, Dallas, TX, Nov. 14, 2006, pp. 1-22.
Bennett, Mike, "Energy Efficient Ethernet Study Group Meeting Minutes", May 29, 2007, 12 pages.
Bennett, Mike, "Energy Efficient Ethernet Study Group Meeting Minutes", Jul. 17, 2007, 7 pages.
Bennett, Mike, "Energy Efficient Ethernet Study Group Meeting Minutes", Sep. 11, 2007, 5 pages.
International Preliminary Report on Patentability for PCT Patent Application No. PCT/US2008/082577 mailed on May 20, 2010, 6 pages.
Office Action Received for Chinese Patent Application No. 200880115221.6, mailed on Jan. 7, 2013, 6 Pages of Chinese Office Action and 8 Pages of English Translation.
Office Action Received for U.S. Appl. No. 11/936,327, mailed on Aug. 26, 2011, 8 pages.
Office Action Received for U.S. Appl. No. 11/936,327, mailed on Jan. 11, 2011, 8 pages.
Office Action Received for U.S. Appl. No. 11/936,327, mailed on Jan. 24, 2012, 8 pages.
Notice of Allowance Received for U.S. Appl. No. 11/936,327, mailed on Jul. 18, 2012, 25 pages.
Office Action Received for U.S. Appl. No. 11/296,958, mailed on Dec. 2, 2008, 21 pages.
Notice of Allowance Received for U.S. Appl. No. 11/296,958, mailed on Apr. 3, 2009, 4 pages.
Office Action Received for U.S. Appl. No. 12/208,905, mailed on Apr. 12, 2011, 14 pages.
Office Action Received for U.S. Appl. No. 12/208,905, mailed on Aug. 1, 2011, 16 pages.
Notice of Allowance Received for U.S. Appl. No. 12/208,905, mailed on Nov. 18, 2011, 16 pages.
Hays, Robert, U.S. Appl. No. 13/647,262, titled "Systems and Methods for Reducing Power Consumption During Communication Between Link Partners", filed Oct. 8, 2012, 26 pages.
Office Action Received for U.S. Appl. No. 13/647,262, mailed on Feb. 27, 2013, 7 pages.
Office Action Received for U.S. Appl. No. 13/647,262, mailed on Jun. 11, 2013, 6 pages.
Notice of Allowance Received for U.S. Appl. No. 13/647,262, mailed on Oct. 18, 2013, 9 pages.
Office Action Received for European Patent Application No. 08848070.2, mailed on Oct. 2, 2013, 9 pages.
Wertheimer et al., U.S. Appl. No. 13/489,434, titled "Negotiating a Transmit Wake Time", filed Jun. 5, 2012, 35 pages.
Office Action Received for U.S. Appl. No. 13/540,246, mailed on Oct. 1, 2013, 23 pages.

(56) References Cited

OTHER PUBLICATIONS

International Search Report and Written Opinion for PCT Patent Application No. PCT/US2009/056498, mailed on May 3, 2010, 5 pages.
Kulkarni et al., "Energy Efficient Communication Based on User Workloads", University of Texas at Dallas, (May 19, 2008), 5 pgs.
International Preliminary Report on Patentability received for PCT Patent Application No. PCT/US2009/056498, mailed on Mar. 24, 2011, 5 pages.
Office Action Received for Japanese Patent Application No. 2012-286613, mailed on Jan. 14, 2014, 1 Page of Office Action and 1 Page of English Translation.
Office Action Received for European Patent Application No. 08848070.2. mailed on Oct. 15, 2013, 5 Pages of Office Action.
Office Action Received for Japanese Patent Application No. 2012-286613, mailed on May 7, 2014, 2 Pages of Office Action and 1 Page of English Translation.
Office Action Received for Chinese Patent Application No. 200980135378.X, mailed on Aug. 26, 2013, 3 pages of Office Action and 4 pages of English Translation.
Notice of Allowance Received for U.S. Appl. No. 13/647,262, mailed on May 12, 2014, 7 pages.
Notice of Allowance Received for U.S. Appl. No. 13/489,434, mailed on Jun. 10, 2014, 9 pages.
Office Action Received for U.S. Appl. No. 12/484,028, mailed on Jun. 18, 2014, 18 pages.
Office Action Received for U.S. Appl. No. 13/889,472, mailed on Jul. 17, 2014, 7 pages.

* cited by examiner

150 or 240

| Addressing Information 310 | | Power State Information 260 | | | | | |
|---|---|---|---|---|---|---|---|
| Source Address 312 | Destination Address 314 | Communications Power State Information 322 | | | Computing Power State Information 330 | | |
| Source Address 312 | Destination Address 314 | Communications Power State Parameter 324 | Communications Idle Duration Parameter 326 | Communications Resume Latency Parameter 328 | Computing Power State Parameter 332 | Computing Idle Duration Parameter 334 | Computing Resume Latency Parameter 336 |

FIG. 3

TECHNIQUES FOR COLLABORATIVE POWER MANAGEMENT FOR HETEROGENEOUS NETWORKS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application is a non-provisional of and claims priority to U.S. Patent Provisional Application Ser. No. 60/973,044 titled "TECHNIQUES FOR COLLABORATIVE POWER MANAGEMENT FOR HETEROGENEOUS NETWORKS" filed on Sep. 17, 2007, and is related to U.S. Patent Provisional Application Ser. No. 60/973,031 titled "BUFFERING TECHNIQUES FOR POWER MANAGEMENT" filed on Sep. 17, 2007, U.S. Patent Provisional Application Ser. No. 60/973,035 titled "TECHNIQUES FOR COMMUNICATIONS BASED POWER MANAGEMENT" filed on Sep. 17, 2007, and U.S. Patent Provisional Application Ser. No. 60/973,038 titled "TECHNIQUES FOR COMMUNICATIONS POWER MANAGEMENT BASED ON SYSTEM STATES" filed on Sep. 17, 2007, all three of which are hereby incorporated by reference in their entirety.

BACKGROUND

Power management for electronic devices such as computer systems play an important part in conserving energy, managing heat dissipation, and improving overall system performance. Modern computers systems are increasingly designed to be used in settings where a reliable external power supply is not available making power management to conserve energy important. Power management techniques allow certain components of a computer system to be powered down or put in a sleep mode that requires less power than while in active operation, thereby reducing the total amount of energy consumed by a device over some period of time. Energy conservation is especially important for mobile devices to conserve battery power. Even when reliable external power supplies are available careful power management within the computing system can reduce heat produced by the system enabling improved performance of the system. Computing systems generally have better performance at lower ambient temperatures because key components can run at higher speeds without damaging their circuitry. Consequently, there are many advantages to enhancing power management for electronic devices.

BRIEF DESCRIPTION OF THE DRAWINGS

FIG. 3 illustrates one embodiment of a data unit.

DETAILED DESCRIPTION

Figure 1:
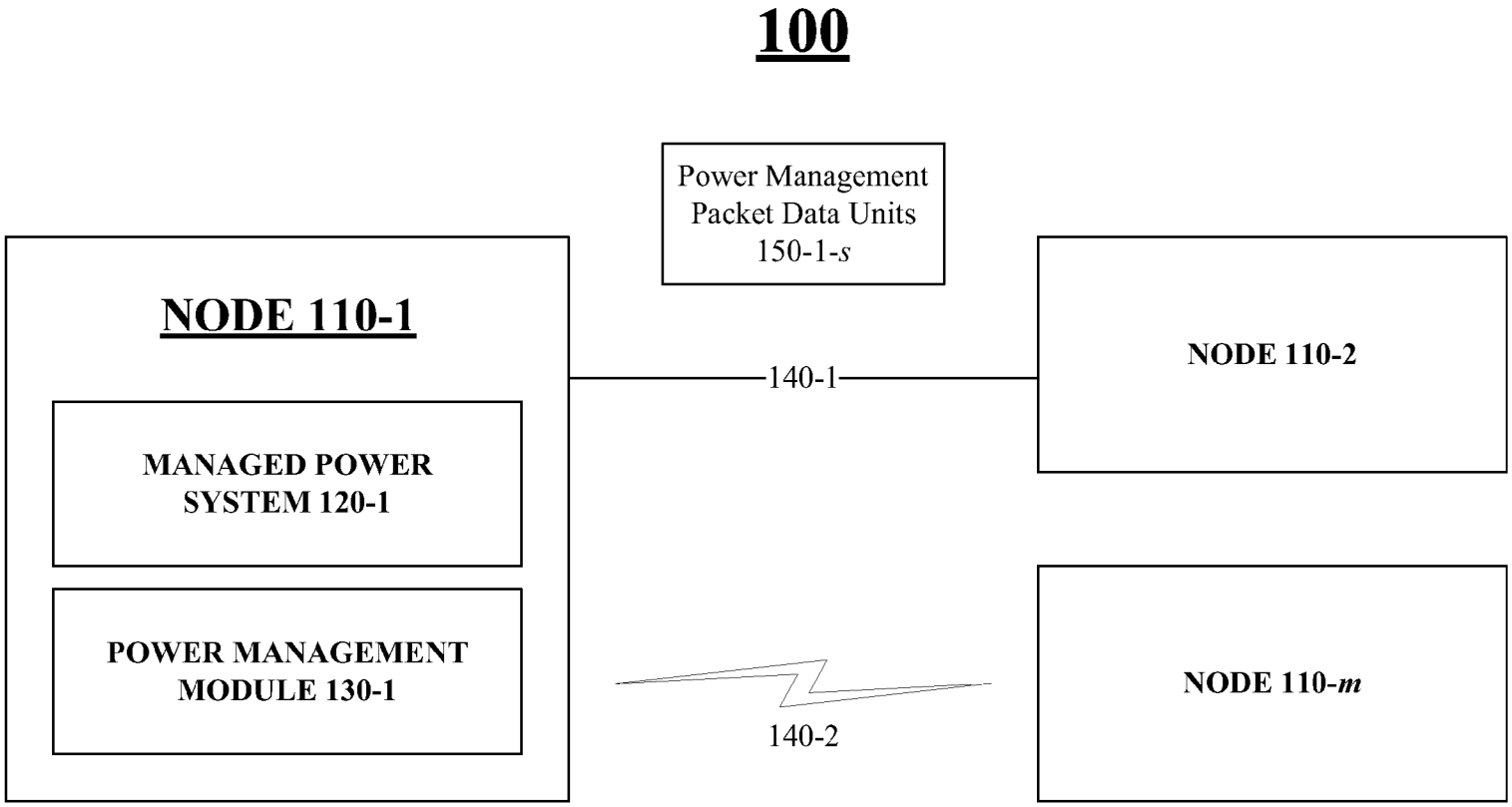
FIG. 1 illustrates one embodiment of a communications system.

Various embodiments may be generally directed to techniques for performing collaborative power management for heterogeneous networks. Some embodiments may be particularly directed to power management techniques to manage power states for multiple nodes based on power state information communicated between the various nodes. In one embodiment, for example, the power state information may be communicated between nodes utilizing a power management packet data unit (PMPDU) for a network link power management (NLPM) protocol. Examples for a node may include various types of heterogeneous network endpoint and infrastructure devices or resources, such as computers, servers, switches, routers, bridges, gateways, and so forth. The power state information may indicate, for example, whether a given node or a portion of a given node is operating in a power-managed state or a full-computation state, the duration for a power-managed state, a resume latency to exit from a power-managed state, and other power related characteristics for the given node. The power management techniques may be implemented, for example, by power gating and/or clock gating various hardware elements of a node, thereby conserving battery power.

In one embodiment, a first node may include a managed power system and a power management module to manage power states for the managed power system. The managed power system may comprise, for example, any devices, components, modules, circuits, or other portions of the first node drawing power from a power source, such as a battery. The power management module may be operative to communicate power state information with a second node over a communications connection utilizing the NLPM protocol. The power state information may include, for example, power states for the various managed power system of the second node, as well as one or more parameters representing certain characteristics of the power states, such as power state duration periods, resume latencies, and so forth. The power management module may manage various power states for the managed power system for the first node based on the power state information for the second node. In this manner, a collection of different network devices may exchange, negotiate and synchronize power state information to improve or enhance power state management for a particular network device or groups of network devices in order to facilitate energy conservation across a heterogeneous communications system. Other embodiments may be described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

FIG. 1 illustrates a block diagram of a communications system 100. In various embodiments, the communications system 100 may comprise multiple nodes. A node generally may comprise any physical or logical entity for communicating information in the communications system 100 and may be implemented as hardware, software, or any combination thereof, as desired for a given set of design parameters or performance constraints. Although FIG. 1 may show a limited number of nodes in a certain topology by way of example, it can be appreciated that more or less nodes may be employed in different topologies for a given implementation.

In various embodiments, the communications system 100 may comprise, or form part of, a wired communications system, a wireless communications system, or a combination of both. For example, the communications system 100 may include one or more nodes 110-1-m arranged to communicate information over one or more types of wired communications links, such as a wired communications link 140-1. Examples of the wired communications link 140-1 may include without limitation a wire, cable, bus, printed circuit board (PCB), Ethernet connection, peer-to-peer (P2P) connection, backplane, switch fabric, semiconductor material, twisted-pair wire, co-axial cable, fiber optic connection, and so forth. The communications system 100 also may include one or more nodes 110-1-m arranged to communicate information over one or more types of wireless communications links, such as wireless shared media 140-2. Examples of the wireless shared media 140-2 may include without limitation a radio channel, infrared channel, radio-frequency (RF) channel, Wireless Fidelity (WiFi) channel, a portion of the RF spectrum, and/or one or more licensed or license-free frequency bands. In the latter case, the wireless nodes may include one more wireless interfaces and/or components for wireless communications, such as one or more radios, transmitters, receivers, transceivers, chipsets, amplifiers, filters, control logic, network interface cards (NICs), antennas, antenna arrays, and so forth. Examples of an antenna may include, without limitation, an internal antenna, an omni-directional antenna, a monopole antenna, a dipole antenna, an end fed antenna, a circularly polarized antenna, a micro-strip antenna, a diversity antenna, a dual antenna, an antenna array, and so forth. In one embodiment, certain devices may include antenna arrays of multiple antennas to implement various adaptive antenna techniques and spatial diversity techniques.

As shown in the illustrated embodiment of FIG. 1, the communications system 100 comprises multiple nodes 110-1-m. The nodes 110-1-m may comprise or be implemented as any type of fixed or mobile electronic device or resource, including a network device, network endpoint equipment, network infrastructure equipment, cellular radiotelephone network equipment, a processing system, a computer system, a computer sub-system, a computer, a workstation, a terminal, a server, a personal computer (PC), a laptop computer, an ultra-laptop computer, a portable computer, a handheld computer, a personal digital assistant (PDA),a cellular telephone, a smart phone, a router, a switch, a bridge, a gateway, a network appliance, a microprocessor, an integrated circuit, a programmable logic device (PLD), a digital signal processor (DSP), a processor, a circuit, a logic gate, a register, a microprocessor, an integrated circuit, a semiconductor device, a chip, a transistor, and so forth. In some embodiments, some of the nodes 110-1 -m may represent heterogeneous network devices. In one embodiment, for example, the nodes 110-1-m may comprise various mobile computer systems (e.g., laptop computers, handheld computers, smart phones, cellular telephones, and so forth) utilizing a mobile power source, such as one or more batteries.

In various embodiments, the nodes 110-1-m may be arranged to communicate various types of information in multiple communications frames as represented by the power management packet data units (PMPDU) 150-1-s via the network or communications links 140-1, 140-2. In various embodiments, the nodes 110-1-m may be arranged to communicate control information related to power management operations. Examples of control information may include without limitation power information, state information, power state information, power management commands, command information, control information, routing information, processing information, system file information, system library information, software (e.g., operating system software, file system software, application software, game software), firmware, an application programming interface (API), a program, an applet, a subroutine, an instruction set, an instruction, computing code, logic, words, values, symbols, and so forth. The nodes 110-1-m may also be arranged to communicate media information, to include without limitation various types of image information, audio information, video information, AV information, and/or other data provided from various media sources.

Although some of the nodes 110-1-m may comprise different network devices, each of the nodes 110-1-m may include a common number of elements as shown by the node 110-1. For example, the nodes 110-1-m may each include various power management elements to implement a power management scheme operative to perform power management operations for the nodes 110-1-m. In the illustrated embodiment shown in FIG. 1, for example, a first node 110-1 may include a managed power system 120-1 coupled to a power management module 130-1. The power management module 130-1 may be operative to communicate power state information with a second node (e.g., one of the nodes 110-2-m) over a communications connection established via the communications links 140-1, 140-2. In general operation, the power management module 130-1 may manage various power states for the managed power system 120-1 of the first node 110-1 based on the power state information for the second node 110-2, and vice-versa. The power state information for the second node 110-2 may include past, present or future power states for one or more portions of a managed power system 120-2 of the second node 110-2. In this manner, the nodes 110-1, 110-2 may exchange power state information to improve or enhance power state management for the first node 110-1, the second node 110-2, or both nodes 110-1, 110-2, thereby facilitating energy conservation across the heterogeneous communications system 100. For example, the power management modules 130-1, 130-2 may synchronize power management operations, particularly with respect to the communications components of the respective managed power systems 120-1, 120-2, such as placing communications components of both nodes 110-1, 110-2 in lower power states at the same or similar times and for the same or similar power state duration periods.

Although the node 110-1 is the only node shown in FIG. 1 to include the managed power system 120-1 and the power management module 130-1, it may be appreciated that each of the nodes 10-1-m may include an identical or similar managed power system 120-1-n and power management module 130-1-p. For example, the node 110-2 may include a managed power system 120-2 coupled to a power management module 130-2, the node 110-3 may include the elements 120-3, 130-3, and so forth. Furthermore, the descriptions and examples of the structures and operations provided with reference to the managed power system 120-1 and the power management module 130-1 may also apply to the corresponding elements in the other nodes 110-2-m. Exemplary embodiments for the managed power system 120-1-n and the power management module 130-1-p may be described in more detail with reference to FIG. 2.

Figure 2:
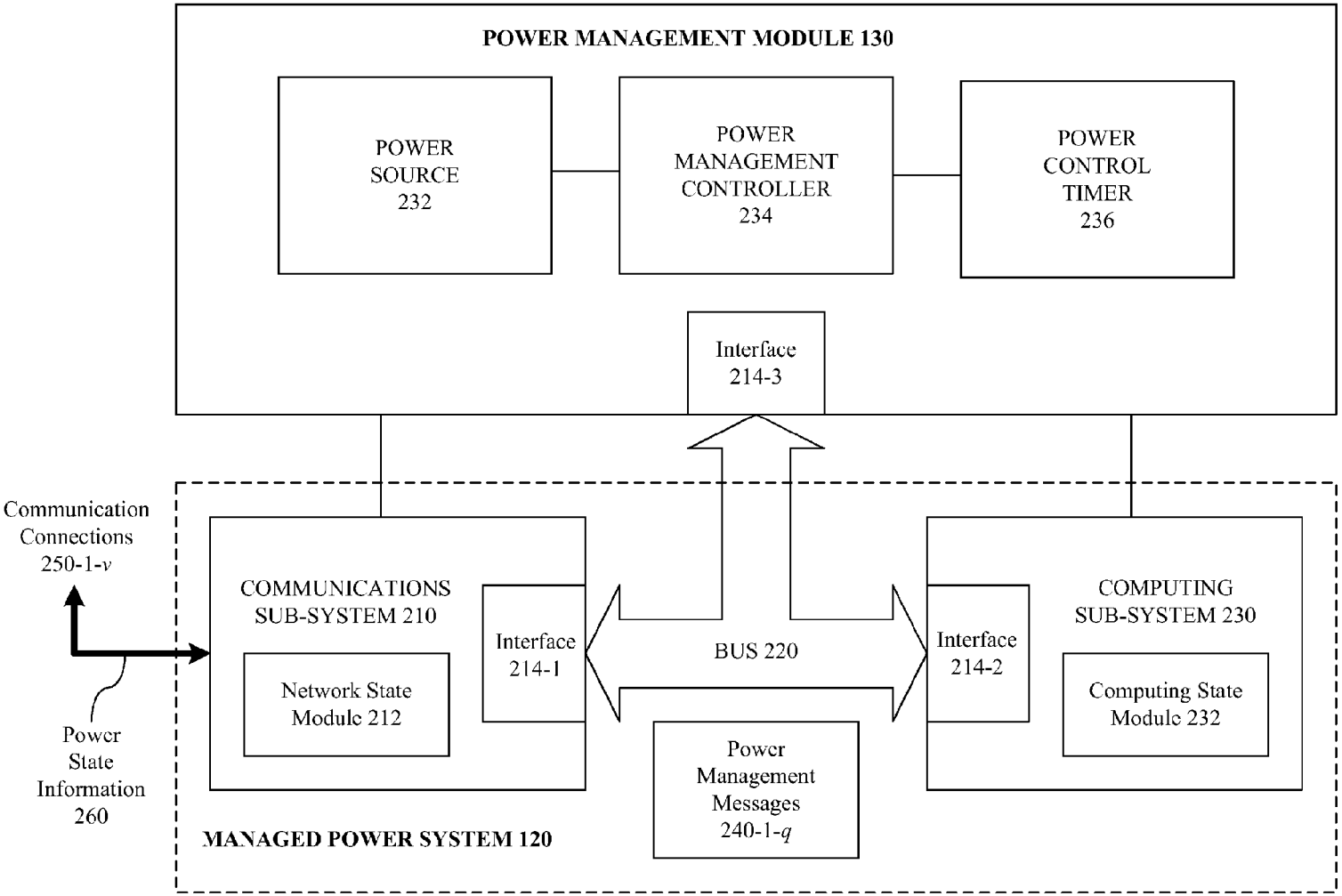
FIG. 2 illustrates one embodiment of an apparatus.

FIG. 2 illustrates a more detailed block diagram for a managed power system 120 and a power management module 130. In the illustrated embodiment shown in FIG. 2, the managed power system 120 may include a communications sub-system 210 and a computing sub-system 230. The communications sub-system 210 may further include a network state module 212 and a power management interface 214-1. The computing sub-system 230 may further include a computing state module 232 and a power management interface 214-2. The power management module 130 may further include a power source 232, a power management controller 234, and one or more power control timers 236. The power management module 130 may also include a power management interface 214-3. The interfaces 214-1, 214-2 and 214-3 may be coupled to a communications bus 220. Although FIG. 2 may show a limited number of power management elements in a certain arrangement by way of example, it can be appreciated that more or less power management elements may be employed in different arrangements for a given implementation.

In various embodiments, the managed power system 120 may include any electrical or electronic elements of the nodes 110-1-m consuming power from the power source 232 and suitable for power management operations. Power management techniques allow certain components of an electronic device or system (e.g., a computer system) to be powered down or put in a sleep mode that requires less power than while in active operation, thereby reducing the total amount of energy consumed by a device over some period of time. The power management techniques may be implemented by power gating and/or clock gating various hardware elements of the managed power system 120, thereby conserving battery power.

More particularly, the managed power system 120 may include various electrical or electronic elements of the nodes 110-1-m that can operate in various power states drawing multiple levels of power from the power source 232 as controlled by the power management controller 234 of the power management module 130. The various power states may be defined by any number of power management schemes. In some cases, for example, the power states may be defined in accordance with the Advanced Configuration and Power Interface (ACPI) series of specifications, including their progeny, revisions and variants. In one embodiment, for example, the power states may be defined by the ACPI Revision 3.0a, Dec. 30, 2005 (the "ACPI Revision 3.0a Specification"). The ACPI series of specifications define multiple power states for electronic devices, such as global system states (Gx states), device power states (Dx states), sleeping states (Sx states), processor power states (Cx states), device and processor performance states (Px states), and so forth. It may be appreciated that other power states of varying power levels may be implemented as desired for a given set of design parameters and performance constraints. The embodiments are not limited in this context.

In some embodiments, the various electrical or electronic elements of the nodes 110-1-m suitable for power management operations may be generally grouped or organized into the communications sub-system 210 and the computing sub-system 230. It may be appreciated, however, that the sub-systems 210, 230 are provided by way of example for purposes of clarity and not limitation, and the managed power system 120 may include other electrical or electronic elements of the nodes 110-1-m suitable for power management operations by the power management module 130. For example, the nodes 110-1-m may typically include a computer monitor or display, such as a digital electronic display or an analog electronic display. Examples of digital electronic displays may include electronic paper, nixie tube displays, vacuum fluorescent displays, light-emitting diode displays, electroluminescent displays, plasma display panels, liquid crystal displays, thin-film transistor displays, organic light-emitting diode displays, surface-conduction electron-emitter displays, laser television displays, carbon nanotubes, nanocrystal displays, and so forth. An example for analog electronic displays may include cathode ray tube displays. Computer monitors are often placed in a sleep mode when an operating system detects that the computer system has not received any input from a user for a defined period of time. Other system components may include digital cameras, touch screens, video recorders, audio recorders, storage devices, vibrating elements, oscillators, system clocks, controllers, and other platform or system architecture equipment. These other system components can also be placed in a sleep or powered down state in order to conserve energy when the components are not in use. The computer system monitors input devices and wakes devices as needed. The embodiments are not limited in this context.

In various embodiments, the managed power system 120 may include the communications sub-system 210. The communications sub-system 210 may comprise various communications elements arranged to communicate information and perform communications operations between the nodes 110-1-m. Examples of suitable communications elements may include any electrical or electronic element designed to communicate information over the communications links 140-1, 140-2, including without limitation radios, transmitters, receivers, transceivers, chipsets, amplifiers, filters, control logic, interfaces, network interfaces, network interface cards (NICs), antennas, antenna arrays, digital signal processors, baseband processors, media access controllers, memory units, and so forth.

In various embodiments, the communications sub-system 210-1 may include one or more transceivers capable of operating at different communications rates. The transceivers may comprise any communications elements capable of transmitting and receiving information over the various wired media types (e.g., copper, single-mode fiber, multi-mode fiber, etc.) and wireless media types (e.g., RF spectrum) for communications link 140-1, 140-2. Examples of the transceivers may include various Ethernet-based PHY devices, such as a Fast Ethernet PHY device (e.g., 100Base-T, 100Base-TX, 100Base-T4, 100Base-T2, 100Base-FX, 100Base-SX, 100BaseBX, and so forth), a Gigabit Ethernet (GbE) PHY device (e.g., 1000Base-T, 1000Base-SX, 1000Base-LX, 1000Base-BX10, 1000Base-CX, 1000Base-ZX, and so forth), a 10 GbE PHY device (e.g., 10GBase-SR, 10GBase-LRM, 10GBase-LR, 10GBase-ER, 10GBase-ZR, 10GBase-LX4, 10GBase-CX4, 10GBase-Kx, 10GBase-T, and so forth), a 100 GbE PHY device, and so forth. The transceivers may also comprise various radios or wireless PHY devices, such as for mobile broadband communications systems. Examples of mobile broadband communications systems include without limitation systems compliant with various Institute of Electrical and Electronics Engineers (IEEE) standards, such as the IEEE 802.11 standards for Wireless Local Area Networks (WLANs) and variants, the IEEE 802.16 standards for Wireless Metropolitan Area Networks (WMANs) and variants, and the IEEE 802.20 or Mobile Broadband Wireless Access (MBWA) standards and variants, among others. The transceivers may also be implemented as various other types of mobile broadband communications systems and standards, such as a Universal Mobile Telecommunications System (UMTS) system series of standards and variants, a Code Division Multiple Access (CDMA) 2000 system series of standards and variants (e.g., CDMA2000 1×RTT, CDMA 2000 EV-DO, CDMA EV-DV, and so forth), a High Performance Radio Metropolitan Area Network (HIPER- MAN) system series of standards as created by the European Telecommunications Standards Institute (ETSI) Broadband Radio Access Networks (BRAN) and variants, a Wireless Broadband (WiBro) system series of standards and variants, a Global System for Mobile communications (GSM) with General Packet Radio Service (GPRS) system (GSM/GPRS) series of standards and variants, an Enhanced Data Rates for Global Evolution (EDGE) system series of standards and variants, a High Speed Downlink Packet Access (HSDPA) system series of standards and variants, a High Speed Orthogonal Frequency-Division Multiplexing (OFDM) Packet Access (HSOPA) system series of standards and variants, a High-Speed Uplink Packet Access (HSUPA) system series of standards and variants, and so forth. The embodiments are not limited in this context. The communications sub-system 210-1 may further include various controllers, control policy modules, buffers, queues, timers and other communications elements typically implemented for a communications system or sub-system.

In various embodiments, the managed power system 120 may include the computing sub-system 230. The computing sub-system 230 may comprise various computing elements arranged to process information and perform computing operations for the nodes 110-1-m. Examples of suitable computing elements may include any electrical or electronic element designed to process information, including without limitation processors, microprocessors, chipsets, controllers, microcontrollers, embedded controllers, clocks, oscillators, audio cards, video cards, multimedia cards, peripherals, memory units, memory controllers, video controllers, audio controllers, multimedia controllers, and so forth.

In various embodiments, the power management module 130 may comprise a power source 232. The power source 232 may be arranged to provide power to the elements of a node 110-1-m in general, and the managed power system 120 in particular. In one embodiment, for example, the power source 232 may be operative to provide varying levels of power to the communications sub-system 210 and the computing sub-system 230. In various embodiments, the power source 232 may be implemented by a rechargeable battery, such as a removable and rechargeable lithium ion battery to provide direct current (DC) power, and/or an alternating current (AC) adapter to draw power from a standard AC main power supply.

In various embodiments, the power management module 130 may include a power management controller 234. The power management controller 234 may generally control power consumption by the managed power system 120. In one embodiment, the power management controller 234 may be operative to control varying levels of power provided to the communications sub-system 210 and the computing sub-system 230 in accordance with certain defined power states. For example, the power management controller 234 may modify, switch or transition the power levels provided by the power source 232 to the sub-systems 210, 230 to a higher or lower power level, thereby effectively modifying a power state for the sub-systems 210, 230.

In various embodiments, the power management module 130 may include one or more power control timers 236. The power control timer 236 may be used by the power management controller 234 to maintain a certain power state for a given power state duration period. The power state duration period may represent a defined time interval a node or portion of a node is in a given power state. For example, the power management controller 234 may switch the computing sub-system 230 from a higher power state to a lower power state for a defined time interval, and when the time interval has expired, switch the computing sub-system 230 back to the higher power state.

In order to coordinate power management operations for a node 110-1-m, the communications sub-system 210, the computing sub-system 230, and the power management module 130 may communicate various power management messages 240-1-q via a communications bus 220 and the respective power management interfaces 214-1, 214-2, and 214-3. To manage power for all the devices in a system, an operating system typically utilizes standard techniques for communicating control information over a particular Input/Output (I/O) interconnect. Examples of various I/O interconnects suitable for implementation as the communications bus 220 and associated interfaces 214 may include without limitation Peripheral Component Interconnect (PCI), PCI Express (PCIe), CardBus, Universal Serial Bus (USB), IEEE 1394 FireWire, and so forth.

Referring again to FIG. 2, the communications sub-system 210 may include a network state module 212. The network state module 212 may be arranged to monitor certain states or characteristics of the communications sub-system 210, such as the traffic activity of the communications connections 250-1-v, capabilities information, and other operations for the various communications elements of the communications sub-system 210. The network state module 212 may send communications power management messages 240-1-q to the power management module 130 with the measured characteristics. The power management module 130 may generate power state information 260 for the managed power system 120 based in part on the communications power management messages 240-1-q.

Similarly, the computing sub-system 230 may include a computing state module 232. The computing state module 232 may be arranged to monitor certain states or characteristics of the computing sub-system 230, such as the level of system activity, capabilities information, and other operations for the various computing elements of the computing sub-system 230. The computing state module 232 may send computing power management messages 240-1-q to the power management module 130 with the measured characteristics. The power management module 130 may generate power state information 260 for the managed power system 120 based in part on the computing power management messages 240-1-q.

In general operation, the power management module 130-1 may perform power management operations for the managed power system 120-1 of the first node 110-1 based on power state information 260 received from one or more other nodes 110-2-m within the communications system 100. For example, the power management module 130-1 for a first node 110-1 may be operative to communicate power state information 260 with a second node 110-2 over a communications connection 250-1-v established via the communications links 140-1, 140-2. The power management module 130-1 may manage various power states for the managed power system 120-1 for the first node 110-1 based on the power state information 260 for the second node 110-2. Examples suitable for implementation as the power state information 260 may be further described with reference to FIG. 3.

The nodes 110-1-m may communicate the power state information 260 over the communications connections 250-1-v established via the communications links 140-1, 140-2 in accordance with various communications protocols. In one embodiment, for example, the nodes 110-1-m may communicate power state information 260 utilizing a specific communications protocol referred to herein as the network link power management (NLPM) protocol. The NLPM protocol may comprise any connectionless or connection-oriented protocol with fields specifically defined to carry power state information 260. The NLPM protocol may be implemented by modifying or using any suitable transports or protocols as defined by one or more protocol standards, such as the standards promulgated by the Internet Engineering Task Force (IETF), International Telecommunications Union (ITU), and so forth. In one embodiment, for example, the NLPM protocol may be implemented by modifying or using such protocols as defined by the IETF document titled "Transmission Control Protocol," Standard 7, Request For Comment (RFC) 793, September, 1981 ("TCP Specification") and its progeny, revision and variants; the IETF document titled "Internet Protocol," Standard 5, RFC 791, September, 1981 ("IP Specification") and its progeny, revision and variants; the IETF document titled "User Datagram Protocol," Standard 6, RFC 768, August, 1980 ("UDP Specification") and its progeny, revision and variants; and so forth. Examples of suitable wireless network systems offering data communications services may include the Institute of Electrical and Electronics Engineers (IEEE) 802.xx series of protocols, such as the IEEE 802.11a/b/g/n/v series of standard protocols and variants (also referred to as "WiFi"), the IEEE 802.16 series of standard protocols and variants (also referred to as "WiMAX"), the IEEE 802.20 series of standard protocols and variants, and so forth. The embodiments are not limited in this context.

FIG. 3 illustrates a block diagram of a PMPDU 150-1-s or a power management message 240-1-q. As shown in FIG. 3, the PMPDU 150-1-s may comprise a representative control frame suitable for use with the NLPM protocol. The PMPDU 150-1-s may comprise multiple fields and corresponding field data to communicate the power state information 260. In one embodiment, for example, the PMPDU 150-1-s may include addressing information 310 and the power state information 260. The addressing information 310 may include a source address 312 and a destination address 314. The power state information 260 may include communications power state information 322 and computing power state information 330. The communications power state information 322 may include, for example, a communications power state parameter 324, a communications idle duration parameter 326, and a communications resume latency parameter 328. The computing power state information 330 may include a computing power state parameter 332, a computing idle duration parameter 334 and a computing resume latency parameter 336. The fields and corresponding field data in the illustrated embodiments shown in FIG. 3 is by way of example and not limitation. It may be appreciated that the PMPDU 150-1-s may include other fields and corresponding field data to communicate the power state information 260.

The addressing information 310, including the source address 312 and the destination address 314, may comprise any unique addressing information for the nodes 110-1-m. Examples of unique addressing information may include network addresses in defined in accordance with the IETF IP Version Four (IPv4) as defined by the IP Specification and the IETF IP Version Six (IPv6), RFC 2460, December 1998 ("IPv6 Specification"), media access control (MAC) addresses, device addresses, globally unique identifiers (GUI), telephone numbers, uniform resource locator (URL), uniform resource identifier (URI), and so forth.

The power state information 260 may represent information explicitly or implicitly related to power states for the nodes 110-1-m, or portions of the nodes 110-1-m, such as the communications sub-system 210 and the computing sub-system 230. As previously described, the power management module 130 may control various power states for the managed power system 120 in accordance with one or more power management standards, such as the ACPI standard. The ACPI standard may be suitable for defining the various power states for a portion of the managed power system 120, such as the communications sub-system 210 and/or the computing sub-system 230. For example, the power management module 130 may control power consumption for a processor and chipset of the computing sub-system 230 using different processor power consumption states (e.g., C0, C1, C2, and C3) as defined by the ACPI Revision 3.0a Specification. This information may be communicated by the PMPDU 150-1-s as part of the computing power state information 330.

In one embodiment, for example, the power management module 130 may control power consumption for the computing sub-system 230 using an abbreviated set of power states from the ACPI Revision 3.0a Specification referred to as system power states. The system power states define various power states specifically designed for the computing elements processing information for the nodes 110-1-m. Examples for the various system power states may be shown in Table 1 as follows:

TABLE 1

| System Power State | Description |
|---|---|
| S0 (On) | This power state indicates that the system is active and in full power mode. |
| S0i (Idle): Duration, Latency | This power state indicates that the system is active and in low power mode. |
| S2 (Off) | This power state indicates that the system is inactive and in off mode. |

As shown in Table 1, the system power states range from S0 to S2, where the S0 power state represents the highest power state with the maximum power draw, the S0i power state represents a lower power state relative to the S0 with a correspondingly lower power draw, and the S2 power state represents the lowest power state with the minimum power draw (or none).

Some of the system power states have associated parameters. For example, the S0i power state has a pair of parameters referred to as a computing idle duration parameter and a computing resume latency parameter. The computing idle duration parameter represents an amount of time, or defined time interval, the computing sub-system 230 will remain in a given power state (e.g., S0i). The computing resume latency parameter represents an amount of time, or defined time interval, the computing sub-system 230 needs to exit a given power state (e.g., S0i) and enter a higher power state (e.g., S0). The computing idle duration parameter and the computing resume latency parameter for the system power states may be communicated by the PMPDU 150-1-s as the respective computing idle duration parameter 334 and the computing resume latency parameter 336.

In various embodiments, the computing state module 232 may be arranged to generate the computing idle duration parameter and the computing resume latency parameter based on the capabilities of the computing sub-system 230-1. For example, the computing sub-system 230-1 may include various processors operating at different speeds, such as a host, application or system processor. In another example, the computing sub-system 230-1 may include various memory units operating at different read/write speeds. In still another example, computing sub-system 230-1 may include various I/O devices, such as a keyboard, mouse, display, memory controllers, video controllers, audio controllers, storage devices (e.g., hard drives), expansion cards, co-processors, and so forth. The computing state module 232 may evaluate these and other computing capabilities of the computing sub-system 210-1, and generate the appropriate computing idle duration parameter and the computing resume latency parameter based on the evaluated capabilities of the computing sub-system 230-1.

Although in some embodiments the power states for the communications sub-system 210 and the computing sub-system 230 may be similarly defined and in synchronization, in some embodiments the power state information 260 may also be differently defined and not synchronized for the sub-systems 210, 230. For example, the power management module 130 may control power consumption for a radio or network interface of the communications sub-system 210 using different power states than defined for the computing sub-system 230. In one embodiment, for example, the power management module 130 may control power consumption for the communications sub-system 210 using a set of power states referred to as NLPM power states. The NLPM power states define various network link power states specifically designed for the communications elements of the communications sub-system 210 communicating information over the given communications links 140-1, 140-2. Examples for the various NLPM power states may be shown in Table 2 as follows:

TABLE 2

| NLPM Power State | Description |
|---|---|
| NL0 (On) | This power state indicates that the network link is active and in full power mode. |
| NL1 (Idle): Duration, Latency | This power state indicates that the network link is active and in low power mode. |
| NL2 (Sleep): Duration, Latency | This power state indicates that the network link is inactive and in sleep mode. |
| NL3 (Off) | This power state indicates that the network link is inactive and in off mode. |

As shown in Table 2, the NLPM power states range from NL0 to NL3, where the NL0 power state represents the highest power state with the maximum power draw, the NL1 and NL2 power states represent incrementally lower power states relative to the NL0 power state with correspondingly lower power draws, and the NL3 power state represents the lowest power state with the minimum power draw (or none).

As with the system power states, some of the NLPM power states have associated parameters. For example, the NL1 (Idle) and NL2 (Sleep) power states each have an associated communications idle duration parameter and a communications resume latency parameter. The communications idle duration parameter represents an amount of time, or defined time interval, the network link or communications sub-system 210-1 will remain in a given power state (e.g., NL1, NL2). The communications idle duration parameter allows the sub-systems 210-1, 230-1 to enter and exit the lower power states with a deterministic manner. The communications resume latency parameter represents an amount of time, or defined time interval, the network link or communications sub-system 210-1 needs to exit a given power state (e.g., NL1, NL2) and enter a higher power state (e.g., NL0). The communications resume latency parameter allows the sub-systems 210-1, 230-1 to determine how soon it can expect the communications sub-system 210-1 to wake up and be ready for providing services such as out-going transmission. The communications idle duration parameter and the communications resume latency parameter for the NLPM power states may be communicated by the PMPDU 150-1-s as the respective communications idle duration parameter 326 and the communications resume latency parameter 328.

In various embodiments, the network state module 212 may be arranged to generate the communications idle duration parameter and the communications resume latency parameter based on the capabilities of the communications sub-system 210-1. For example, the communications sub-system 210-1 may implement various buffers to store information received from the communications connections 250-1-v, such as network packets, and forward the information for servicing and processing by the computing sub-system 230-1. In another example, the communications sub-system 210-1 may also implement various buffers to store information received from the communications bus 220, such as network packets, and forward the information for communications by the communications sub-system 210-1 to other nodes 110-2-m over the communications connections 250-1-v via the communications links 140-1, 140-2. In yet another example, the communications sub-system 210-1 may include various wired or wireless transceiver operating at different communications speeds, such as the IEEE 802.3-2005 standard 10 Gigabit Ethernet (10 GbE or 10 GigE), the IEEE 802.3 ba proposed standard 100 Gigabit Ethernet (100 GbE or 100 GigE), and so forth. In still another example, the communications sub-system 210-1 may include various processors operating at different speeds, such as baseband or communications processor. In still another example, the network state module 212 may monitor the rate of information being received over the communications connections 250-1-v via the communications links 140-1, 140-2. In this example, the network state module 212 of the communications sub-system 210-1 may monitor the communications links 140-1, 140-2 to measure packet inter-arrival times. Other examples of communications capabilities may include other network traffic load measurements on the communications links 140-1, 140-2 (e.g., synchronous traffic, asynchronous traffic, burst traffic, and so forth), a signal-to-noise ratio (SNR), a received signal strength indicator (RSSI), throughput of the communications bus 220, physical layer (PHY) speed, power state information 260 for other nodes 110-2-m received via one or more PMPDU 150-1-s, and so forth. The network state module 212 may evaluate these and other network or communications capabilities of the communications sub-system 210-1, and generate the appropriate communications idle duration parameter and the communications resume latency parameter based on the evaluated capabilities of the communications sub-system 210-1.

In various embodiments, the nodes 10-1-m may use the system power states and/or the NLPM power states to enhance power management operations for a given node 110-1-m, or group of nodes 110-1-m, to improve energy conservation (e.g., increase battery life or decrease battery size), heat dissipation or overall system performance. In one embodiment, the power management module 130-1 of the first node 110-1 may modify a power level for the managed power system 120-1 from a first power level to a second power level using the power state information 260 for the second node 110-2. Furthermore, the power management module 130-1 may modify the power level for the managed power system 120-1 from a first power level to a second power level for a defined time interval determined using the power state information for the second node.

By way of example, assume the second node 110-2 sends a PMPDU 150-1-s to the first node 110-1 with power state information 260 for the managed power system 120-2 of the second node 110-2 as follows:

Communications Power Level Parameter=NL1

Communications Idle Duration Parameter=100 milliseconds (ms)

Communications Resume Latency Parameter=1 ms

The first node 110-1 may receive the PMPDU 150-1-s over a communications connection 250-1-v via the communications sub-system 210-1. The network state module 212 of the communications sub-system 210-1 may forward the power state information 260 via one or more power management messages 240-1-q over the communications bus 220 to the power management controller 234 of the power management module 130-1. The communications sub-system 210-1 and the power management controller 234 may communicate the power management messages 240-1-q over the communications bus 220 using the respective interfaces 214-1, 214-3. The power management controller 234 may receive the power management messages 240-1-q, and retrieve the received parameters (e.g., NL1/100 ms/1 ms) from the power state information 260. Since the communications sub-system 210-1 does not expect to receive any packets from the second node 110-2 for at least 100 ms, the power management controller 234 may send one or more power management messages 240-1-q to the communications sub-system 210-1 to modify a power level for the communications sub-system 210-1 from a first power level NL0 (On) to a second power level NL1 (Idle) for a power state duration period of approximately 100 ms (or less) as determined using the power state information 260 received from the second node 110-2. The power state duration period of 100 ms may be measured or timed by the power control timer 236.

It may be appreciated that the power management controller 234 of the first node 110-1 may also include other factors other than the received communications idle duration parameter when determining a power state duration period for the communications sub-system 210-1. For example, the power management controller 234 may determine a power state duration period using the communications resume latency parameter of 10 ms for the communications sub-system 210-2 of the second node 110-2. In this case, the power control timer 236 for the communications sub-system 210-1 may be set for an idle mode of 100 ms+1 ms=101 ms power state duration period. In another example, the power management controller 234 may set the power control timer 236 for the communications sub-system 210-1 with a power state duration period that accounts for the communications resume latency parameter for the communications sub-system 210-1. Assume this parameter represents 2 ms, the power control timer 236 for the communications sub-system 210-1 may be set for a power state duration period of 100 ms+1 ms (resume latency for sub-system 210-2)−2 ms (resume latency for sub-system 210-1)=99 ms.

The power management controller 234 may also determine an appropriate power state duration period for the communications sub-system 210-1 using various measured characteristics of the communications links 140-1, 140-2. The network state module 212 may be arranged to monitor the communications links 140-1, 140-2 to measure certain channel, link or traffic characteristics, such as one-way or two-way latency associated with communicating packets over the communications connection 250-1-v. For example, the network state module 212 of the communications sub-system 210-1 may monitor the communications links 140-1, 140-2 to measure packet inter-arrival times, and update the power management controller with a mean or median packet inter-arrival time. The power management controller 234 may increase or decrease the power state duration period to account for network link latencies using the measured packet inter-arrival time. Other modifiers for the power state duration period may include other network traffic load measurements on the communications links 140-1, 140-2 (e.g., synchronous traffic, asynchronous traffic, burst traffic, and so forth), a signal-to-noise ratio (SNR), a received signal strength indicator (RSSI), throughput of the communications bus 220, physical layer (PHY) speed, power state duration periods for other portions of the node 110-1, and so forth.

In addition to modifying a power state for the communications sub-system 210-1 based on the power state information 260 from the second node 110-2, the power management controller 234 may also modify a power state for the computing sub-system 230-1. Since the communications sub-system 210-1 will not expect to receive any packets from the second node 110-2 for at least 100 ms, and therefore the computing sub-system 230-1 does not need to process any packets, events or interrupts from the communications sub-system 210 for at least 100 ms, the power management controller 234 may also send one or more power management messages 240-1-q to the computing sub-system 230-1 to modify a power level for the computing sub-system 230-1 from a first power level S0 (On) to a second power level S0i (Idle) for a power state duration period of approximately 90 ms so it can save system power, yet be able to wake up soon enough to service any incoming traffic or events received from the communications sub-system 210-1. Similarly, the power management controller 234 of the second node 110-2 may place the computing sub-system 230-2 to the S0i (Idle) power state for a defined time interval of approximately 90 ms as well to perform energy conservation for the second node 110-2.

In one embodiment, the power management module 130-1 may send power state information 260 for the managed power system 120-1 of the first node 110-1 to the second node 110-2 in order to negotiate a power state for the managed power system 120-1 of the first node 110-1, and vice-versa. For example, prior to modifying power states for the nodes 110-1, 110-2, the nodes 110-1, 110-2 may exchange capabilities information, estimated traffic loads, power management schedules, and other power management related information. The power management modules 130-1, 130-2 of the respective nodes 110-1, 110-2 may use the capabilities information and estimated traffic loads to negotiate an appropriate NLPM power state, system power state, power state duration period, and associated parameters (e.g., idle duration, resume latency) suitable for a communications session between the nodes 110-1, 110-2 using the communications connections 250-1-v via the communications links 140-1, 140-2. In this manner, the nodes 110-1, 110-2 may synchronize communications based on traffic load and power states to enhance energy conservation by one or both of the nodes 110-1, 110-2.

Although various embodiments describe sharing power state information 260 between adjacent nodes 110-1, 110-2, it may be appreciated that any combination of nodes 110-1-m of the communications system 100 may share power state information 260 to enhance energy conservation. For example, the nodes 110-1, 110-3 may share power state information 260 to perform power management operations similar to those described for the nodes 110-1, 110-2. In some cases, the power state information 260 may take multiple hops prior to arriving at an intended destination node. For example, the nodes 110-1, 110-3 may share the power state information 260 as propagated through an intermediate node, such as the second node 110-2. In other cases, the nodes 110-1, 110-2 and 110-3 may all shared power state information 260, and provide certain offsets to the appropriate idle duration parameters and the resume latency parameters to account for any propagation latency and traffic considerations.

In some embodiments, the managed power system 120-1 may use the power state information 260 received from the second node 110-2 to enhance other performance characteristics of the managed power system 120-1. For example, if the power state information 260 includes a communications power state parameter indicating that the communications sub-system 210-2 of the second node 110-2 will be entering an NL3 (Off) power state, the communications sub-system 210-1 may use this information to switch to a different communications connection 250-1-v or communications link 140-1, 140-2.

Figure 4:
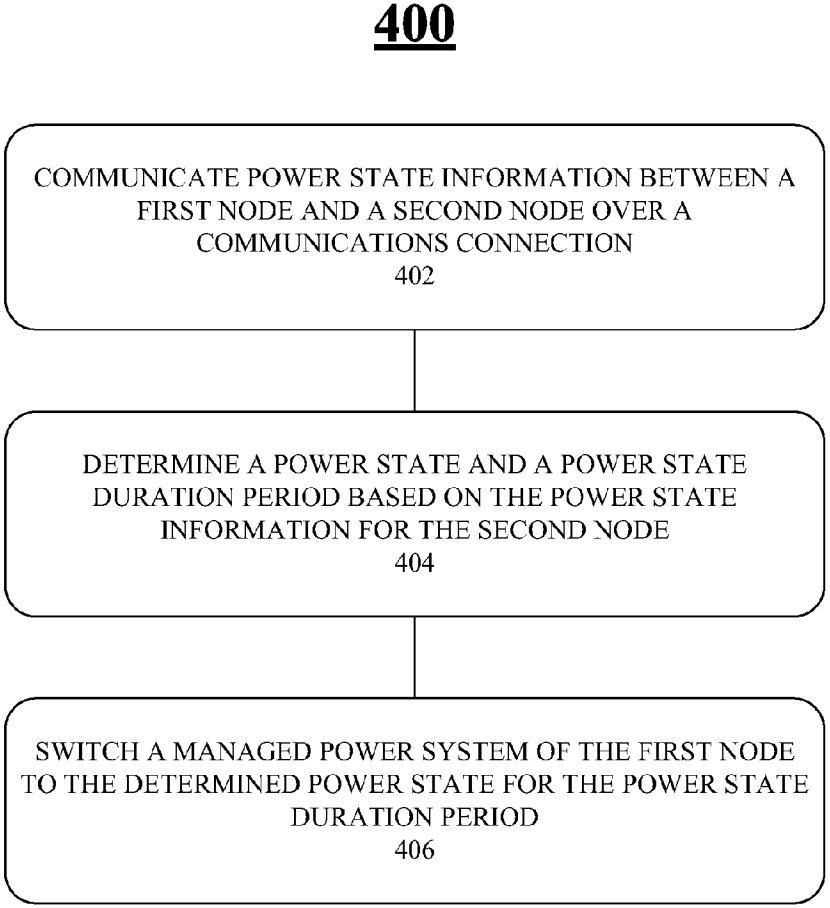
FIG. 4 illustrates one embodiment of a logic diagram.

FIG. 4 illustrates a logic flow 400 in accordance with one or more embodiments. The logic flow 400 may be performed by various systems and/or devices and may be implemented as hardware, software, and/or any combination thereof, as desired for a given set of design parameters or performance constraints. For example, the logic flow 400 may be implemented by a logic device (e.g., processor) and/or logic (e.g., instructions, data, and/or code) to be executed by a logic device. For purposes of illustration, and not limitation, the logic flow 400 is described with reference to FIGS. 1-3.

The logic flow 400 may illustrate various operations for the nodes 110-1-m in general, and the managed power system 120 and the power management module 130 in particular. As shown in FIG. 4, the logic flow 400 may communicate power state information between a first node and a second node over a communications connection at block 402. The logic flow 400 may determine a power state and a power state duration period based on the power state information for the second node at block 404. The logic flow 400 may switch a managed power system of the first node to the determined power state for the power state duration period at block 406. The embodiments are not limited in this context.

In one embodiment, the logic flow 400 may communicate power state information between a first node and a second node over a communications connection at block 402. For example, the first node 110-1 may send power state information 260 to the second node 110-2 over a communications connection 250-1-v, and vice-versa. In another example, the first node 110-1 may receive power state information 260 from the second node 110-2 over a communications connection 250-1-v, and vice-versa. The power state information 260 may include a power state, an idle duration parameter and a resume latency parameter for portions of the managed power system 120-2 of the second node 110-2, such as the communications sub-system 210-2 and/or the computing sub-system 230-2 of the managed power system 120-2.

In one embodiment, the logic flow 400 may determine a power state and a power state duration period based on the power state information for the second node at block 404. As previously described, the power state duration period may represent a time period or time interval when the managed power system 120-1 is in a given power state. For example, the power management controller 234 of the first node 110-1 may determine the power state duration period by evaluating, among other factors, the received communications idle duration parameter and the received resume latency parameter for the second node 110-2. In another example, the power management controller 234 of the first node 110-1 may also determine the power state duration period by evaluating the communications resume latency parameter for the communications sub-system 210-1. In yet another example, the power management controller 234 may of the first node 110-1 may determine the power state duration period by evaluating various measured characteristics of the communications links 140-1, 140-2. In this case, the network state module 212 may be arranged to monitor the communications links 140-1, 140-2 to measure certain channel, link or traffic characteristics, such as one-way or two-way latency associated with communicating packets over the communications connection 250-1-v. For example, the network state module 212 of the communications sub-system 210-1 may monitor the communications links 140-1, 140-2 to measure packet inter-arrival times, and update the power management controller with a mean or median packet inter-arrival time. The power management controller 234 may increase or decrease the power state duration period to account for network link latencies using the measured packet inter-arrival time. Other factors for determining the power state duration period may include other network traffic load measurements on the communications links 140-1, 140-2 (e.g., synchronous traffic, asynchronous traffic, burst traffic, and so forth), a signal-to-noise ratio (SNR), a received signal strength indicator (RSSI), throughput of the communications bus 220, physical layer (PHY) speed, power state duration periods for other portions of the node 110-1, and so forth.

In one embodiment, the logic flow 400 may switch a managed power system of the first node to the determined power state for the power state duration period at block 406. For example, the first node 110-1 may modify a power state for the managed power system 120-1 based on power state information 260 received from the second node 110-2. The power management module 130-1 may switch the communications sub-system 210-1 and/or the computing sub-system 230-1 between various power states for various durations based on power state parameters, idle duration parameters and resume latency parameters for the respective sub-systems 210-2, 230-2 of the second node 110-2. For example, the power management module 130-1 may switch the communications sub-system 210-1 for the managed power system 120-1 from an active power state (NL0) to an idle power state (NL1) for the power state duration period. In another example, the power management module 130-1 may switch the computing sub-system 230-1 for the managed power system 210-1 from an active power state (S0) to an idle power state (S0i) for the power state duration period.

In some cases, various embodiments may be implemented as an article of manufacture. The article of manufacture may include a computer-readable medium or a storage medium arranged to store logic and/or data for performing various operations of one or more embodiments. Examples of computer-readable media or storage media may include, without limitation, those examples as previously described. In various embodiments, for example, the article of manufacture may comprise a magnetic disk, optical disk, flash memory or firmware containing computer program instructions suitable for execution by a general purpose processor or application specific processor. The embodiments, however, are not limited in this context.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Examples of what could be claimed include the following:

The invention claimed is:

1. An apparatus, comprising:

a first node having a managed power system and a power management module to manage power states for the managed power system, the power management module operative to communicate power state information with a second node over a communications connection, and manage the power states for the managed power system based on power state information for the second node, the managed power system to include a communications sub-system and a computing sub-system, the power management module having a power management controller operative to control varying levels of power provided to the communications sub-system and the computing sub-system based on an idle duration parameter and a resume latency parameter of the power state information for the second node, the power management module to modify a power level for the communications sub-system or the computing sub-system from a first power level to a second power level based on the idle duration parameter and resume latency parameter for the second node.

2. The apparatus of claim 1, the power management module to modify the power level for the communications sub-system or the computing sub-system from the first power level to the second power level for a power state duration period determined using the power state information for the second node.

3. The apparatus of claim 1, the power management module to receive power state information for the second node using a power management packet data unit for a network link power management protocol.

4. The apparatus of claim 1, the power state information for the second node to include a communications power state for a communications sub-system for the second node, the communications power state to include a communications idle duration parameter and a communications resume latency parameter.

5. The apparatus of claim 1, the power state information for the second node to include a computing power state for a computing sub-system for the second node, the computing power state to include a computing idle duration parameter and a computing resume latency parameter.

6. The apparatus of claim 1, the power management module having a power source operative to provide varying levels of power to the communications sub-system and the computing sub-system based on the power state information for the second node.

7. The apparatus of claim 1, the power management module having a power control timer operative to provide timing information to control varying time periods when varying levels of power are provided to the communications sub-system and the computing sub-system based on the power state information for the second node.

8. The apparatus of claim 1, the communications sub-system having a network state module operative to send communications power management messages to the power management module, the power management module to generate power state information for the managed power system based on the communications power management messages.

9. The apparatus of claim 1, the computing sub-system having a computing state module operative to send computing power management messages to the power management module, the power management module to generate power state information for the managed power system based on the computing power management messages.

10. A system, comprising:

a first node having a managed power system and a power management module, the managed power system comprising a digital electronic display, a communications sub-system and a computing sub-system, the power management module operative to communicate power state information with a second node over a communications connection, and manage power states for the communications sub-system or the computing sub-system based on power state information for the second node, the managed power system to include a communications sub-system and a computing sub-system, the power management module having a power management controller operative to control varying levels of power provided to the communications sub-system and the computing sub-system based on an idle duration parameter and a resume latency parameter of the power state information for the second node, the power management module to modify a power level for the communications sub-system or the computing sub-system from a first power level to a second power level based on the idle duration parameter and resume latency parameter for the second node.

11. The system of claim 10, the second node comprising a managed power system and a power management module, the power management module of the second node to generate and communicate power state information for the managed power system of the second node to the first node.

12. The system of claim 10, the communications sub-system comprising a radio and an omni-directional antenna.

13. The system of claim 10, the computing sub-system comprising a processor, a chipset, and static random access memory.

14. A method, comprising:

communicating power state information between a first node and a second node over a communications connection;

determining a power state and a power state duration period based on the power state information for the second node;

switching a managed power system of the first node to the determined power state for the power state duration period, the managed power system to include a communications sub-system and a computing sub-system;

controlling varying levels of power provided to the communications sub-system and the computing sub-system based on an idle duration parameter and a resume latency parameter of the power state information for the second [network device] *node*; and modifying a power level for the communications sub-system or the computing sub-system from a first power level to a second power level based on the idle duration parameter and resume latency parameter for the second [network device] *node*.

15. The method of claim 14, comprising negotiating the power state and power state duration period for the managed power system with the second node.

16. The method of claim 14, comprising communicating the power state information between the first node and the second node over a wireless communications link using a power management protocol data unit for a network link power management protocol.

17. The method of claim 14, comprising switching the communications sub-system for the managed power system from an active power state to an idle power state for the power state duration period.

18. The method of claim 14, comprising switching the computing sub-system for the managed power system from an active power state to an idle power state for the power state duration period.

19. An article of manufacture comprising a *non-transitory* computer-readable medium containing instructions that if executed enable a system to:

receive at a first network device power state information for a second network device over a network connection;

manage power states for a managed power system of the first network device based on the power state information for the second network device, the managed power system to include a communications sub-system and a computing sub-system;

control varying levels of power provided to the communications sub-system and the computing sub-system based on an idle duration parameter and a resume latency parameter of the power state information for the second network device; and modify a power level for the communications sub-system or the computing sub-system from a first power level to a second power level based on the idle duration parameter and resume latency parameter for the second network device.

20. The article of claim 19, further comprising instructions that if executed enable the system to modify the power level for the communications sub-system or the computing sub-system from a higher power level to a lower power level based on the power state information for the second network device.

21. The article of claim 19, further comprising instructions that if executed enable the system to modify the power level for the communications sub-system or the computing sub-system from a lower power level to a higher power level based on the power state information for the second network device.

22. The article of claim 19, further comprising instructions that if executed enable the system to modify the power level for the communications sub-system or the computing sub-system from a first power level to a second power level for a defined time interval determined using the power state information for the second network device.

23. The article of claim 19, further comprising instructions that if executed enable the system to negotiate a power state for the managed power system with the second network device.

* * * * *